United States Patent [19]
Carlson

[11] 3,980,352
[45] Sept. 14, 1976

[54] SPRING BEARING ASSEMBLY

[75] Inventor: Jerome A. Carlson, Woodside, Calif.

[73] Assignee: Tribotech Incorporated, Redwood City, Calif.

[22] Filed: Feb. 24, 1975

[21] Appl. No.: 552,126

Related U.S. Application Data

[62] Division of Ser. No. 359,610, May 11, 1973, abandoned.

[52] U.S. Cl. ............................ 308/73; 29/149.5 B; 285/261; 308/26; 308/72; 308/137; 308/160
[51] Int. Cl.² ................. F16C 17/02; F16C 17/10; F16C 23/04; F16C 27/02
[58] Field of Search ............... 285/261; 308/29, 72, 308/73, 144, 237 R, 237 A, 26, 137, 160; 29/149.5, 149.5 B; 317/11

[56] References Cited
UNITED STATES PATENTS

| | | | |
|---|---|---|---|
| 1,266,061 | 5/1918 | Scoville | 285/261 |
| 1,384,173 | 7/1921 | Wikander | 308/237 R |
| 1,595,744 | 8/1926 | Trumpler | 308/237 R |
| 1,735,881 | 11/1929 | Seastedt | 308/144 |
| 2,047,885 | 7/1936 | Riebe | 308/29 |
| 2,309,281 | 1/1943 | Steele | 308/72 X |
| 2,478,056 | 8/1949 | Reeg | 308/72 |
| 2,804,679 | 9/1957 | Tracy | 29/149.5 |
| 2,894,789 | 7/1959 | Tracy | 308/72 |
| 3,020,101 | 2/1962 | McCaslin | 308/72 |
| 3,084,417 | 4/1963 | Picca | 308/72 X |
| 3,351,999 | 11/1967 | McClosley | 308/72 X |
| 3,434,762 | 3/1969 | Marley | 308/73 X |
| 3,528,710 | 9/1970 | Roesner et al. | 308/72 |
| 3,655,249 | 4/1972 | Abel | 308/72 |
| 3,665,249 | 5/1972 | Zajic | 317/11 |
| 3,929,392 | 12/1975 | Ogino | 308/26 |

*Primary Examiner*—Robert J. Spar
*Assistant Examiner*—Howard Beltran
*Attorney, Agent, or Firm*—Flehr, Hohbach, Test, Albritton & Herbert

[57] ABSTRACT

A bearing member positioned between an inner race surface and an outer race surface and urged into constant positive contact with said race surfaces by internal bearing spring forces. Predetermined contact areas are formed on the outer surface of said bearing member for contact with the outer race, and on the inner surface of said bearing for contact with the inner race. The bearing member is flexed between the inner and outer races within the range of elastic deformation of the bearing member material and is configured to cooperate with the inner and outer races to provide either radial or thrust load capability or a combination of both.

9 Claims, 14 Drawing Figures

3,980,352

SPRING BEARING ASSEMBLY

This application is a division of copending application Ser. No. 359,610, filed May 11, 1973, now abandoned.

BACKGROUND OF THE INVENTION

This invention relates to an elastic spring bearing member, and more particularly to a bearing member for use in high shock and vibratory load environments.

Many applications exist for bearings which allow relative rotation between a housing and a journal, and where adequate torque is available to overcome minimal torques imposed by the bearing. High shock and vibratory loads are encountered in a large number of such applications as, for example, in the linkage associated with aircraft landing gear. Constant vibration at the pivot points joining the links is experienced whether the aircraft is airborne or rolling on the ground. High shock loads are experienced by the same pivot points at touchdown or when the gear is raised or lowered during flight.

High shock and vibratory loads cause fretting and deterioration of bearings as the bearing member and the bearing races alternately separate and regain contact causing high impact loads on the races. The fretting causes increased bearing wear as the races rotate relative to one another and pivot failure or malfunction may occur due to bearing deterioration. A requirement for early bearing replacement results, causing additional maintenance cost.

There is therefore a need for a bearing member which does not deteriote in high shock and vibratory load environments, because it does not cause the normal fretting of the races and subsequent raceway wear as the bearings perform their function.

SUMMARY AND OBJECTS OF THE INVENTION

The spring bearing member may be used directly between a housing and a shaft journal having integral raceways and with any combination of housing, journal, and inner and outer races. The bearing member extends between the inner and outer race surfaces substantially filling the volume defined therebetween. The bearing member is deformed slightly toward a circular shape at assembly to place it in the volume between the inner and outer races. When assembled it contacts the outer race on its outer race on its outer surface at certain predetermined areas, and the inner race on its inner surface at certain predetermined areas. The bearing member is flexed within its elastic range of deformation when subjected to normal loads, always maintaining some finite spring force between the surface contact areas and the inner and outer races.

In general it is an object of the present invention to provide a spring bearing member which will not deteriorate in high shock and vibratory load environments.

Another object of the invention is to provide a spring bearing member of the above character which will maintain a preload between the inner and outer races for all bearing load conditions.

Another object of the invention is to provide a spring bearing member of the above character which reduces fretting and wear of the bearing races enhancing safety and reducing maintenance costs.

Another object of the invention is to provide a spring bearing member of the above character which provides for axial floating of the housing or the journal without loss of the bearing member radial preload.

It is another object of the invention to provide a spring bearing member which is capable of supporting thrust loads.

It is another object of the invention to provide a spring bearing member with combined radial and thrust load support capabilities.

Additional objects and features of the invention will appear from the following description in which the preferred embodiments are set forth in detail in conjunction with the accompanying drawings.

DESCRIPTION OF THE PREFERRED EMBODIMENTS

Figure 2:
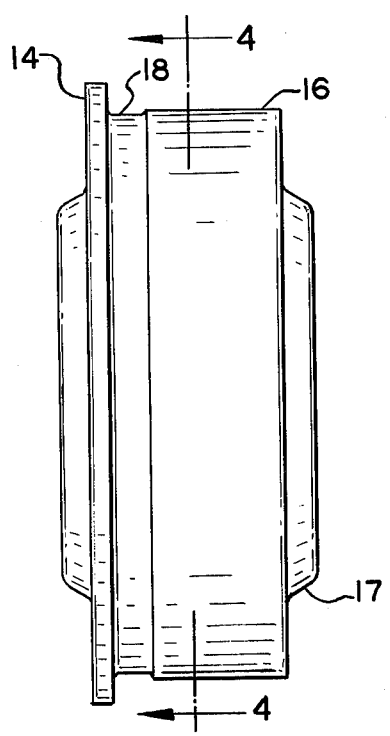
FIG. 2 is a side elevational view of an assembled spring bearing.
Figure 1:
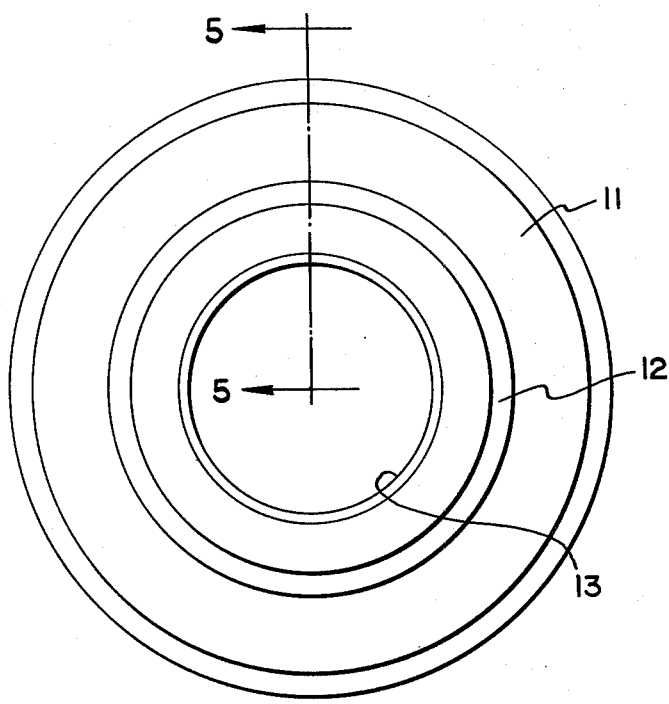
FIG. 1 is a front elevational view of an assembled spring bearing.

Bearings for providing relative rotation between a housing and a journal have wide application. Where some minimal level of bearing threshold torque is tolerable a bearing member providing sliding contact between the bearing member and the inner and outer races is acceptable. Such a bearing is shown in FIG. 1. An outer race 11 surrounds an inner race 12 having a hole 13 for accepting a shaft journal (not shown). Referring to FIG. 2 a flange 14 is formed on the front face of the outer race 11 which has an outside diameter 16 for fitting into a housing (not shown). The inner race 12 is seen to have a spherical bearing surface configuration 17 in FIG. 2 which extends axially beyond the axial length of the outer race 11. A relief 18 on the outer diameter 16 is formed adjacent to the flange 14 to preclude interference with the face of the housing when outer diameter 16 is inserted into the housing.

Figure 3:
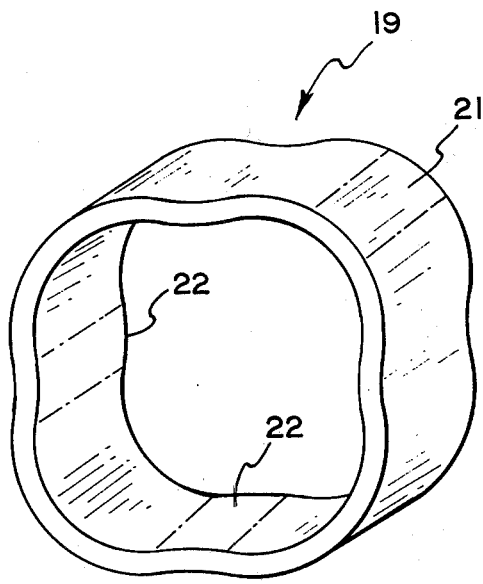
FIG. 3 is an isometric view of a continuous bearing member.

The spring bearing member may take the form of a continuous bearing member 19 shown in FIG. 3. Bearing member 19 is formed to produce outwardly projecting lobe areas 21 on its outer surface and inwardly extending areas 22 on its inner surface. The configuration in FIG. 3 may be seen to have four outwardly projecting lobe areas 21 and four inwardly extending areas 22.

Figure 4A:
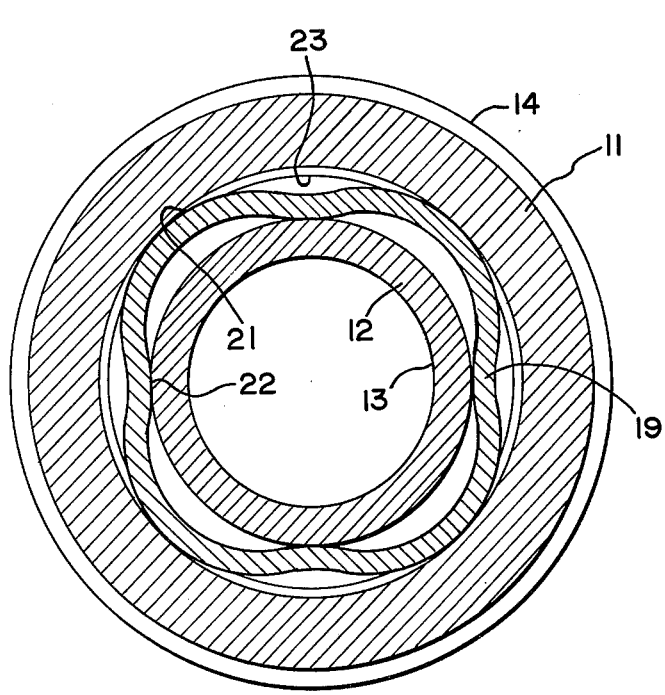
FIG. 4a is a sectional view along the line 4—4 of FIG. 2 showing a continuous bearing segment.

Referring to FIG. 4a the continuous bearing member 19 is shown assembled in a bearing between outer race 11 and inner race 12. Outer lobe areas 21 are shown in contact with outer race 11 and inwardly areas 22 are shown in contact with inner race 12. A shoulder 23 on the inside diameter of outer race 11 contacts the front edge of continuous bearing member 19. A similar shoulder (not shown) contacts the rear edge of continuous bearing member 19 for retaining it in the bearing assembly.

Continuous bearing member 19 is shown having a rectangular cross section in FIG. 3. Referring to FIGS. 5a through 5e alternative cross section configurations of continuous bearing member 19 are shown at 19a through 19e.

The explanation of the function of the bearing containing the continuous spring bearing member 19 is undertaken first with reference to FIG. 4a. Outer race shoulder 23 is shown retaining continuous bearing member 19 between the outer and inner race 11 and 12 respectively. Continuous bearing member 19 is purposely shown with exaggerated lobe areas 21 and inwardly extending areas 22 for illustrative purposes. In assembling bearing 19 between outer and inner races 11 and 12 bearing member 19 is deformed to assume a circular shape so that it may pass by shoulders 23 on outer race 11. Thereafter it is allowed to partially resume its unrestrained shape. Outer and inner races 11 and 12 prevent complete resumption of the unrestrained shape as the space or volume between the outer and inner races 11 and 12 is small enough to exert pressure on the outer lobe areas 21 and inwardly extending areas 22 respectively. Thus inner race 12 is suspended by a radial spring force provided by continuous bearing member 19. Radial loads sufficient to completely flatten continuous bearing member 19 between the races will not cause internal bending stress in continuous spring bearing member 19 which exceed the elastic limit of the bearing member material. The volume between the races 11 and 12 and the distortion of the bearing member 19 from a true circular shape are carefully controlled to assure that maximum internal bending stresses are maintained within tne elastic limit of the spring bearing member material.

Figure 5A:
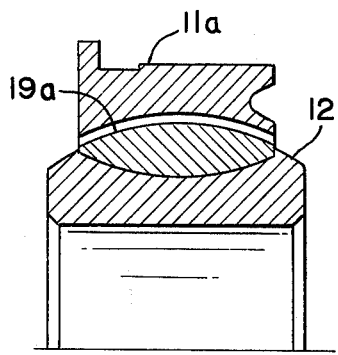
FIG. 5a is a sectional view along the line 5—5 of FIG. 1 showing one configuration of the spring bearing member.
Figure 5B:
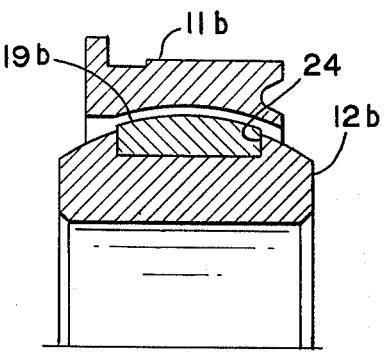
FIG. 5b is a sectional view along the line 5—5 of FIG. 1 showing a second configuration of the spring bearing member.
Figure 5C:
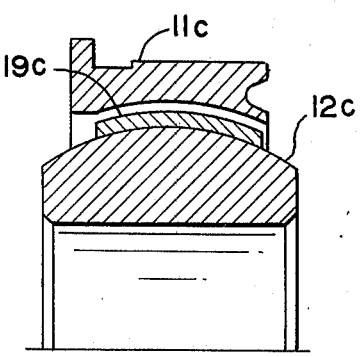
FIG. 5c is a sectional view along the line 5—5 of FIG. 1 showing a third configuration of the spring bearing member.
Figure 5D:
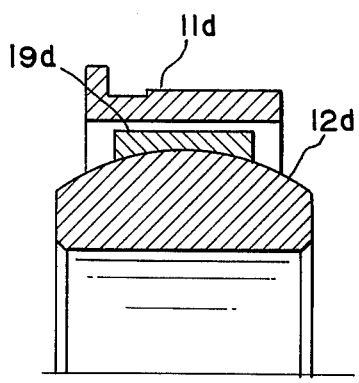
FIG. 5d is a sectional view along the line 5—5 of FIG. 1 showing a fourth configuration of the spring bearing member.
Figure 5E:
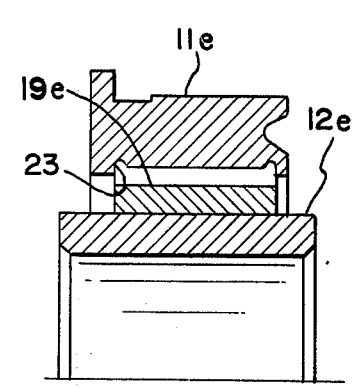
FIG. 5e is a sectional view along the line 5—5 of FIG. 1 showing a fifth configuration of the spring bearing member.

Referring to FIGS. 5a through 5e it may be seen that means are provided in each instance for preventing axial separation between the outer and inner races 11 and 12. Shoulders 24 are provided on the inner race 12 in FIG. 5b to retain bearing member 19b. Shoulders 23 on the outer race 11 as described above are seen in FIG. 5e to retain bearing member 19e. In FIGS. 5a, 5c and 5d, spring bearing members 19a, 19c, and 19d are respectively retained axially between outer and inner races 11 and 12 by the cross sectional shape of the bearing members in cooperation with a similar matching shape on the respective races.

Referring again to FIG. 4a outer and inner races 11 and 12 may rotate relative to one another with only the kinetic friction arising between the outer lobe areas 21 and the outer race 11 and between the inwardly extending areas 22 and the inner race 12 providing bearing torques resisting rotation. Four lobe areas 21 and inwardly extending areas 22 are shown for illustrative purposes only. Any number of lobes and inwardly extending areas may be utilized as one means of adjusting bearing radial stiffness. The points of contact are spaced through equal arcs to maintain substantially constant spring bearing radial stiffness for any radial load direction. It should be noted that FIGS. 5a through 5e show a space between the inner diameter of outer race 11a through 11e and the outer diameter of continuous bearing member 19a through 19e. This is in keeping with the position selected for section 5—5 in FIG. 1 which corresponds to a section through the uppermost portion of the bearing in FIG. 4a.

Figure 6:
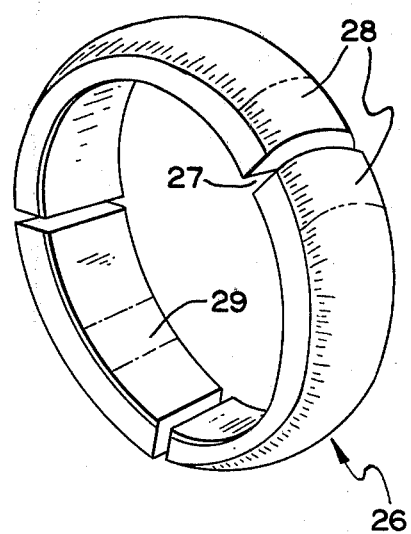
FIG. 6 is an isometric view of a segmented spring bearing member.

Turning now to FIG. 6 a second embodiment of the spring bearing member is shown. A segmented spring bearing member 26 is shown having a cross section as shown in FIG. 5b as an example. Segmented spring bearing member 26 is shown having three segments formed by making cuts 27 at 120° intervals around the bearing member 26. Three cuts 27 were chosen for illustrative purposes, though the principle is identical when using one to five or more cuts.

Figure 4B:
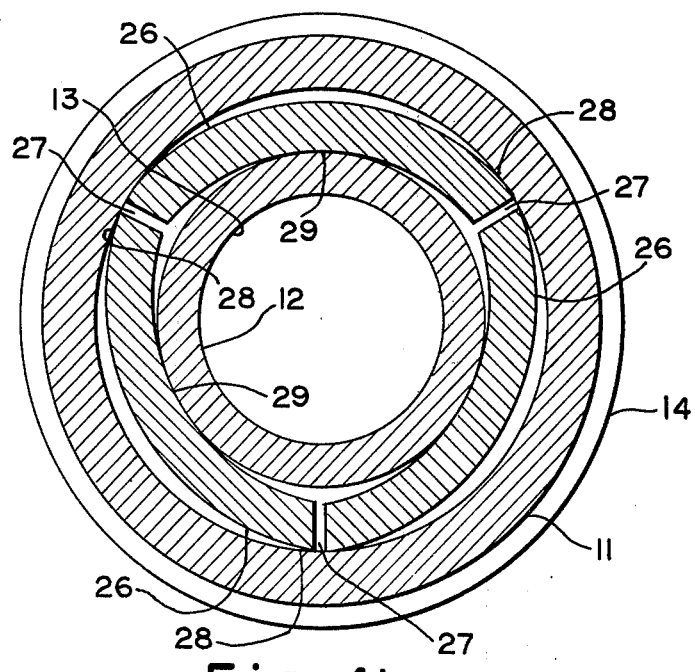
FIG. 4b is a sectional view along the line 4—4 of FIG. 2 showing a segmented bearing member.

Turning to FIG. 4b the segments 26 are shown in place between the outer and inner races 11 and 12 respectively. Segmented spring bearing member 26 has an outside diameter which is greater than the inside diameter of outer race 11. Bearing member 26 also has an inside diameter which is greater than the outside diameter of inner race 12. Segmented spring bearing 26 is shown in FIG. 4b with the diameter differentials exaggerated for illustrative purposes. Bearing segments 26 are shown to bear on the inside diameter of outer race 11 at areas 28 on the outside diameter of the segment ends. Due to their relative geometry the bearing segments 26 are seen to bear on the outside diameter of inner race 12 at central areas 29 on the inside diameter of the segments 26.

Turning now to the function of the second embodiment described herein reference is made to FIG. 4b. Assembly of the bearing is effected by bending the bearing segments 26 to assume a shorter radius, and in that condition inserting them between the outer and inner races 11 and 12. The bending is designed to be well within the elastic limits of the material used to fabricate the segmented bearing member 26. With no radial loading spring bearing member 26 assumes the position seen in 4b and provides radial spring forces between the outer and inner races 11 and 12. A radial load will overcome all or part of the spring forces provided by segmented bearing 26 tending to bend the segments into conformance with the adjacent diameters of outer and inner races 11 and 12. As explained above this bending is designed to produce bending stress well within the elastic limits of the material utilized to fabricate the segmented spring bearing member 26.

Segments 26 can also be made with an inner radius smaller than the radius of inner race 12 and an outer radius smaller than the radius of outer race 11. Contact is then between the ends of segments 26 and inner race 12 and the center of segments 26 and outer race 11. However, functional characteristics are exactly as previously described.

Rotating bearing torques result from kinetic friction between the outer race 11 and areas 28, and between the inner race 12 and areas 29 on segmented bearing member 26. The cross section shapes of the segmented bearing member 26 may assume any of the cross sectional shapes shown for continuous bearing member 19 in FIGS. 5a through 5e. As explained above, a space exists between the outside diameter of the bearing segments 26 and the inside diameter of the outer race 11 in FIGS. 5a through e because the sectional view is taken along line 5—5 of FIG. 1 through that point of the bearing where areas 29 are in contact with the inner race 12.

Figure 7:
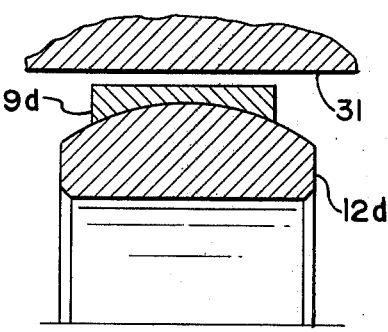
FIG. 7 is a sectional view showing a spring bearing member utilizing a housing as an outer race.

Turning now to FIG. 7 a brief description of a third embodiment of the present invention will be presented. An inner race 12d is in contact with a continuous bearing member 19d. A housing 31 replaces and performs the function of an outer race. In this embodiment either a continuous bearing member 19 or a segmented bearing member 26 may be used. The bearing is assembled in the same fashion as described above and functions identically. This configuration may allow the housing 31 and inner race 12d to float laterally relative to one another. It should be noted that the spring bearing member 19 or 26 could be mounted on a journal integral with a shaft (not shown) and could be contacted at the outside diameter by an outer race 11 mounted within a bore in the housing 31. A further variation of the principle illustrated in FIG. 7 could include the spring bearing member 19 or 26 disposed surrounding a journal integral with a shaft, and contacted on the outside diameter by a surface performing the function of an outer race and formed integral with the housing 31.

Figure 8:
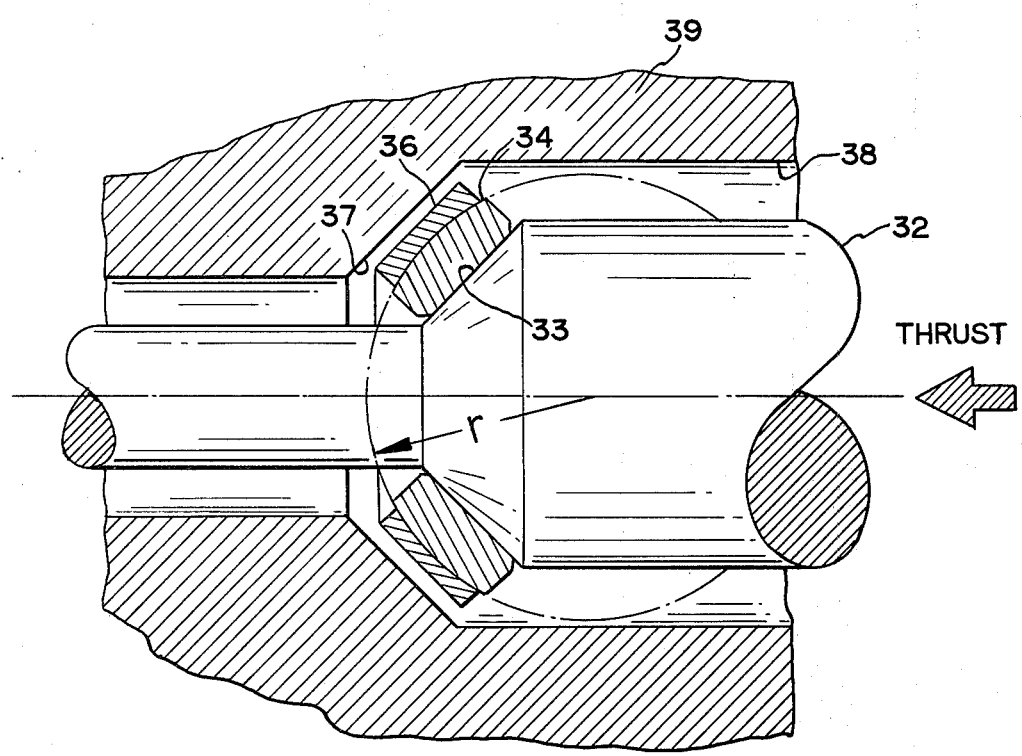
FIG. 8 is a sectional view of a spring bearing member for thrust loading.

A fourth embodiment of the present invention is shown in FIG. 8. A shaft 32 having a bevelled shoulder or journal 33 supports an inner race 34 having an inside diameter describing a conical surface formed to fit on journal 33. Inner race 34 has in this embodiment a spherical curve formed on its outer surface with a radius r. A bearing member 36 having generally the shape of the shell of a frustum of a cone and having an inner surface with a spherical curve formed similar to the outer surface of inner race 34 also has an outer surface formed similar to a conical bore or countersink 37 formed in a through bore 38 through a housing 39.

The bearing configuration shown in FIG. 8 is subject to the same variations as described for FIG. 7 above. It should be noted that bearing member 36 is shown at a section where a space exists between the outer surface of bearing member 36 and conical bore 37. In the embodiment of FIG. 8 the bearing is specifically designed for a thrust application in the direction of the arrow shown. Either the continuous or the segmented spring bearing member 19 or 26 may be used in this embodiment. As also described above any of the bearing member cross sectional shapes shown in FIGS. 5a through 5e may be useful in place of that shown for illustrative purposes at 36. The bearing member 36 may approach the shape of an annular washer with bearing surfaces in planes substantially transverse to the axis of shaft 32 in the limiting situation where loading is 100% thrust load. Means would then be required to provide for centering the shaft 32 in bore 38.

Figure 9:
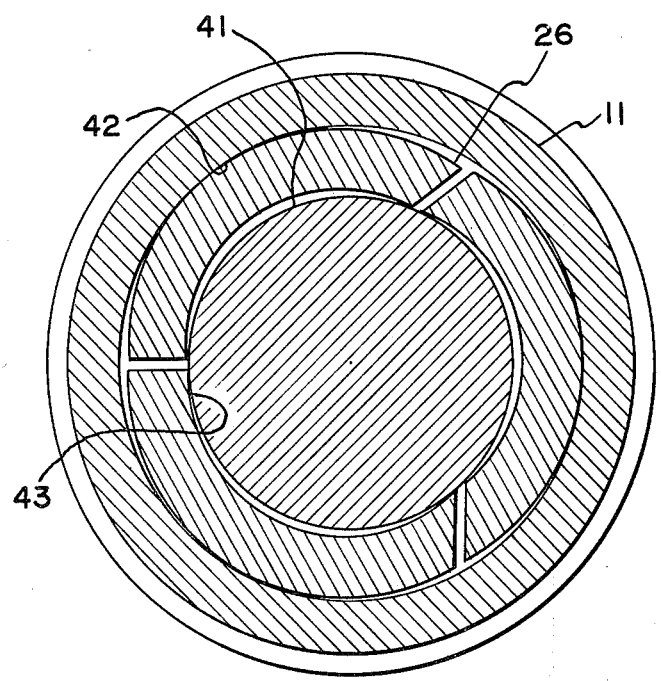
FIG. 9 is a sectional view showing a spring bearing member utilizing a journal as an inner race.

FIG. 9 illustrates an embodiment mentioned as a variation of the configuration of FIG. 7 described above. An outer race member 11 has an inside diameter for contact with a segmented bearing member 26. Segmented bearing 26 is disposed between outer race 11 and a journal 41. In this instance, bearing member 26 has an outside diameter smaller than the inside diameter of outer race 11, and an inside diameter smaller than the diameter of journal 41. The segments of bearing 26 contact the outer race at central points 42 and the journal 41 at end points 43. Assembly of the configuration of FIG. 9 is effected in the same manner as assembly of the device in FIG. 4b above and the functional performance would be similar. The configuration of bearing member 26 may be of any convenient cross sectional shape such as those disclosed herein in FIGS. 5a through e.

A bearing having a spring bearing member has been devised which does not show physical deterioration in high shock and vibration environments and which may be fabricated of any suitable material showing sufficient elasticity and considering the application and environment. The spring bearing member never separates from either raceway and may be formed to function as a thrust bearing as well as a radial bearing.

I claim:

1. A spring bearing member disposed between an inner race surface and an outer race surface for supporting a load therebetween, a plurality of separate segments in annular disposition between the inner and outer race surfaces in end to end relation and having inner and outer surfaces, a portion of said inner and outer segment surfaces being in positive contact with said inner and outer race surfaces respectively for both static and dynamic conditions, said separate segments having a dimensional configuration so that elastic deformation only occurs about the arc length thereof by relative radial motion between said inner and outer race surfaces, whereby bearing loads are supported and relative rotation between said inner and outer races may occur.

2. A spring bearing member as in claim 1 wherein said plurality of separate segments comprises three segments, each of said three segments subtending an obtuse angle.

3. A spring bearing member as in claim 1 wherein said separate segments have a cross section which is curviformed on at least one of said inner and outer segment surfaces, said inner and outer race surfaces being similar in configuration to said inner and outer segment surfaces respectively, whereby said separate segments are retained axially between said race surfaces.

4. A spring bearing member for maintaining positive contact between an inner race and an outer race disposed for relative rotating motion therebetween for yieldably supporting a load, comprising a bearing member having a plurality of separate segments disposed in an annular array, an outer surface on each of said plurality of separate segments, an inner surface on each of said plurality of separate segments, said annular array of separate segments being disposed between the inner and outer races for contact therewith, the ends of one separate segment being adjacent ends of others of said plurality of separate segments, said annular array operating to support pressure between said inner and outer segment surfaces and the inner and outer races respectively.

5. A spring bearing member as in claim 4 wherein said plurality of separate segments comprises three segments, each of said segments subtending an obtuse angle.

6. A bearing for use between a housing and a journal, comprising an inner race on the journal, an outer race in the housing, a segmented bearing member disposed between said inner and outer races and having separate segments disposed in end to end relationship forming an annular array, means for retaining said separate segments axially between said inner race and said outer race, a first plurality of areas on said segmented bearing member for contact with said outer race, a second plurality of areas on said segmented bearing member for contact with said inner race, said separate segments yielding elastically only when subjected to bearing loading thereby maintaining a positive contact force between said second and first plurality of areas and said inner and outer races respectively for all operating conditions, whereby assembly of the bearing is facilitated by the segmented character of said bearing member and fretting and wear at said inner and outer races due to impact and vibratory bearing loads is reduced.

7. A bearing as in claim 6 wherein said separate segments are three in number, and each segment subtends an obtuse angle.

8. A bearing as in claim 6 wherein said separate segments have a cross sectional shape which is curviform on at least one surface thereof, said inner and outer races having cross section contours substantially conforming to said cross sectional shape, said segmented bearing member being retained axially between said inner and outer races by said cross section contours.

9. A bearing as in claim 6 wherein said means for retaining said separate segments axially comprises shoulders on said outer race in juxtaposition with the edges of said segmented bearing member.

* * * * *